United States Patent [19]
Senda

[11] Patent Number: 5,496,116
[45] Date of Patent: Mar. 5, 1996

[54] ARTICLE INFORMATION PRINTER HAVING PAGE AND LINE PRINT MODES

[75] Inventor: Kouji Senda, Shizuoka, Japan

[73] Assignee: Kabushiki Kaisha TEC, Shizuoka, Japan

[21] Appl. No.: 249,262

[22] Filed: May 25, 1994

[30] Foreign Application Priority Data

May 31, 1993 [JP] Japan ................. 5-129015

[51] Int. Cl.$^6$ ........................ B41J 5/30
[52] U.S. Cl. ............... 400/61; 400/76; 400/103
[58] Field of Search .................. 400/61, 62, 76, 400/103, 63, 67, 70, 582; 395/102, 109, 117

[56] References Cited

U.S. PATENT DOCUMENTS

| | | | |
|---|---|---|---|
| 3,858,703 | 1/1975 | Duley | 400/124.08 |
| 5,078,518 | 1/1992 | Ono et al. | 400/103 |
| 5,179,636 | 1/1993 | Anzai | 395/111 |
| 5,229,587 | 7/1993 | Kimura et al. | 400/103 |
| 5,294,202 | 3/1994 | Sawada et al. | 400/103 |
| 5,322,375 | 6/1994 | Niwa et al. | 400/76 |

FOREIGN PATENT DOCUMENTS

| | | |
|---|---|---|
| 0434055A3 | 6/1991 | European Pat. Off. . |
| 0446928A3 | 9/1991 | European Pat. Off. . |
| 0457165A2 | 11/1991 | European Pat. Off. . |
| 0459515A3 | 12/1991 | European Pat. Off. . |

OTHER PUBLICATIONS

Patent Abstracts of Japan, vol. 11, No. 114 (M-579) Apr. 10, 1987 & JP-A-61 258 767 (Ishida Scales Mfg. Co., Ltd.) Nov. 17, 1986.

Patent Abstracts of Japan, vol. 17, No. 286 (M-1422) Jun. 2, 1993 & JP-A-05 016 439 (Tokyo Electric Co., Ltd.), Jan. 26, 1993.

Patent Abstracts of Japan, vol. 12, No. 464 (M-771) Dec. 6, 1988 & JP-A-63 189 276 (Ishida Scales Mfg. Co., Ltd.) Aug. 4, 1988.

*Primary Examiner*—John S. Hilten
*Attorney, Agent, or Firm*—Frishauf, Holtz, Goodman, Langer & Chick

[57] ABSTRACT

An article information printer is composed of a printing head having a row of dot printing elements, for performing a printing on paper by the dot printing elements. Particularly, the print controller has a mode setting section for setting one of a page selection mode and a line selection mode, a first image producing section for performing in the page selection mode a process of converting print data for one page supplied from an external device as article information into dot images and storing the dot images in the memory as the print image data, and a second image producing section for performing in the line selection mode a process of converting print data for one line supplied from the external device as article information into dot images and storing the dot images as the print image data. The second image producing section includes a printing height changing section for changing the number of dot lines for the print image data according to the maximum height of the dot images obtained for one line.

5 Claims, 9 Drawing Sheets

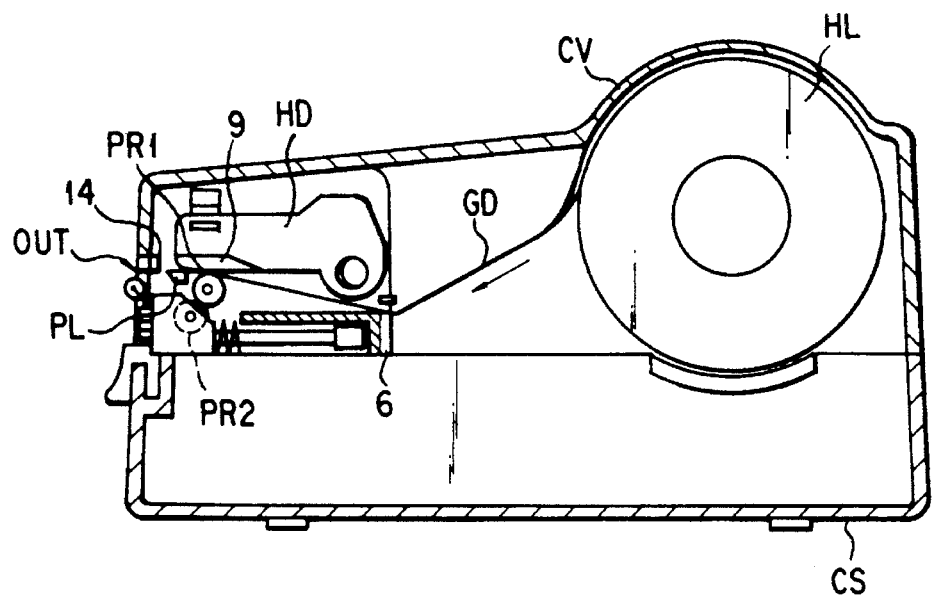
F I G. 1
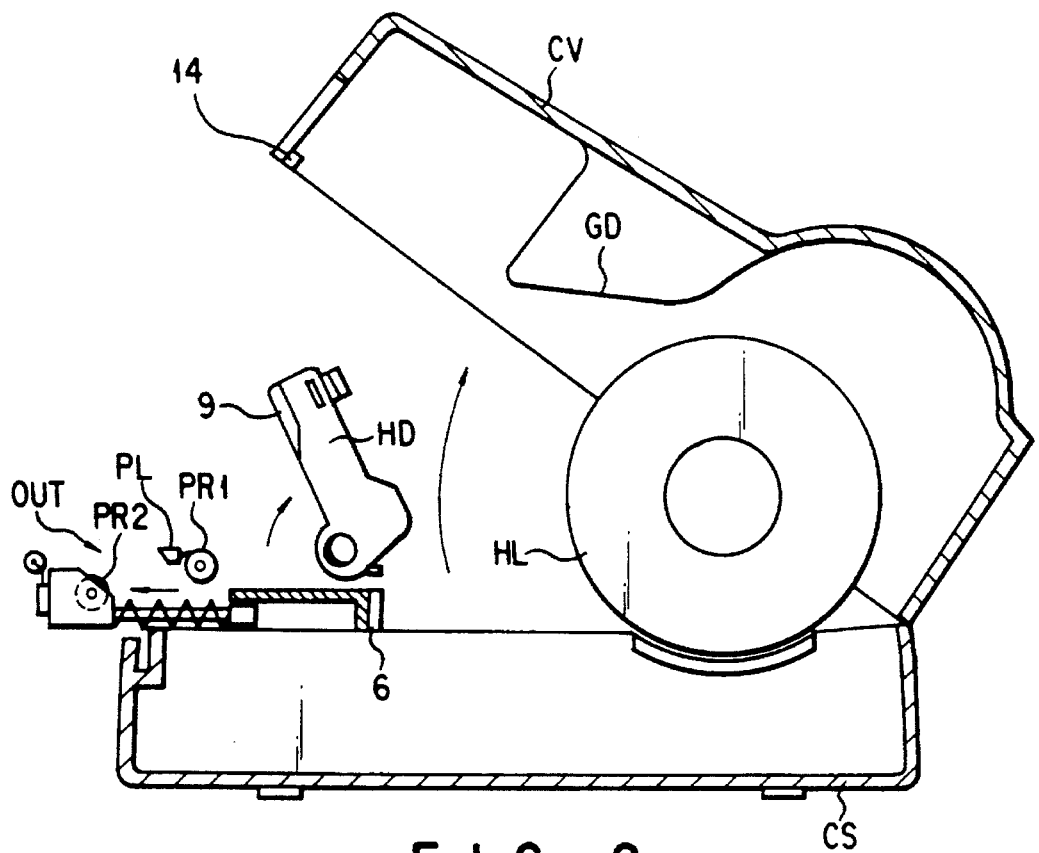
F I G. 2

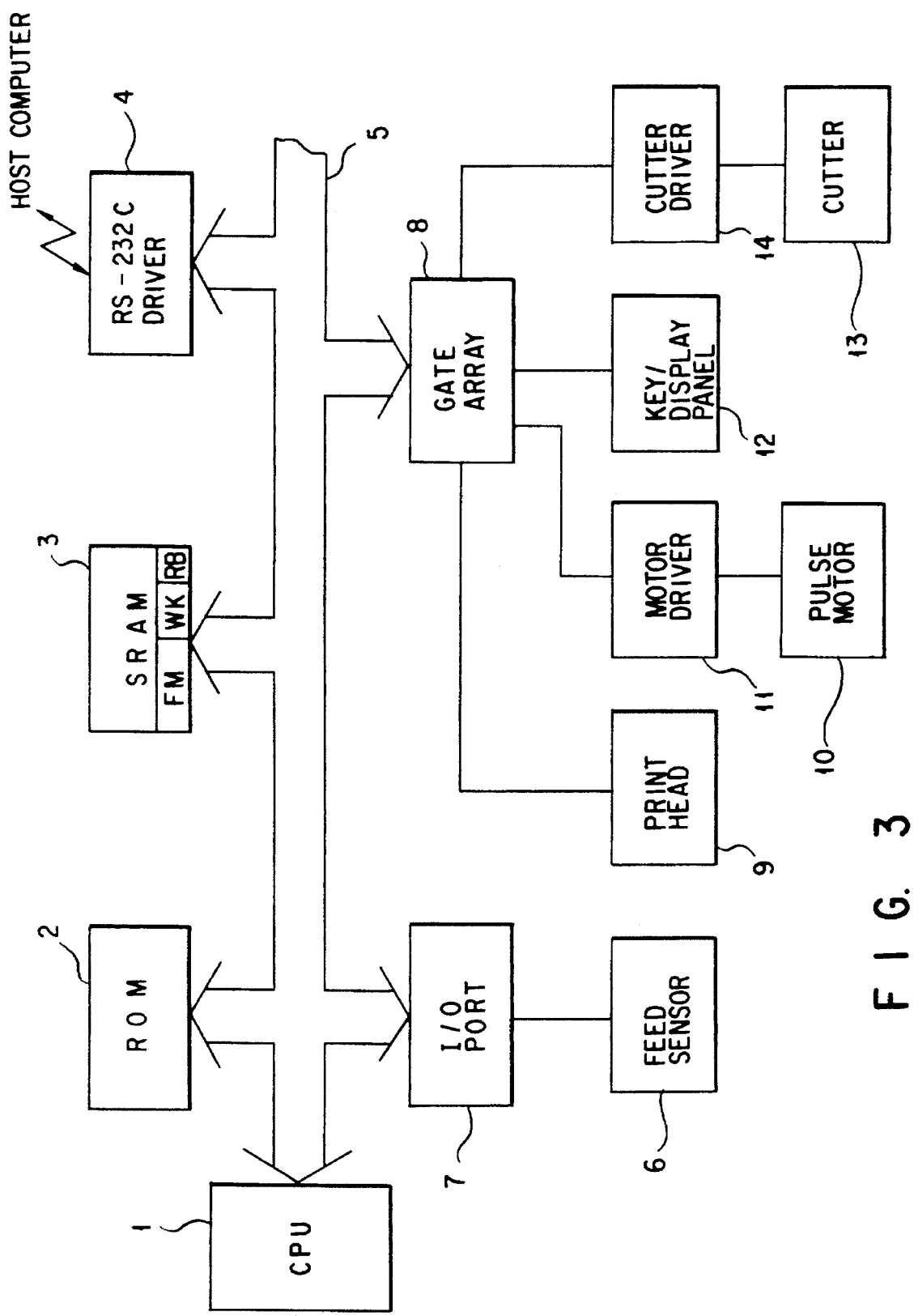
F I G. 3

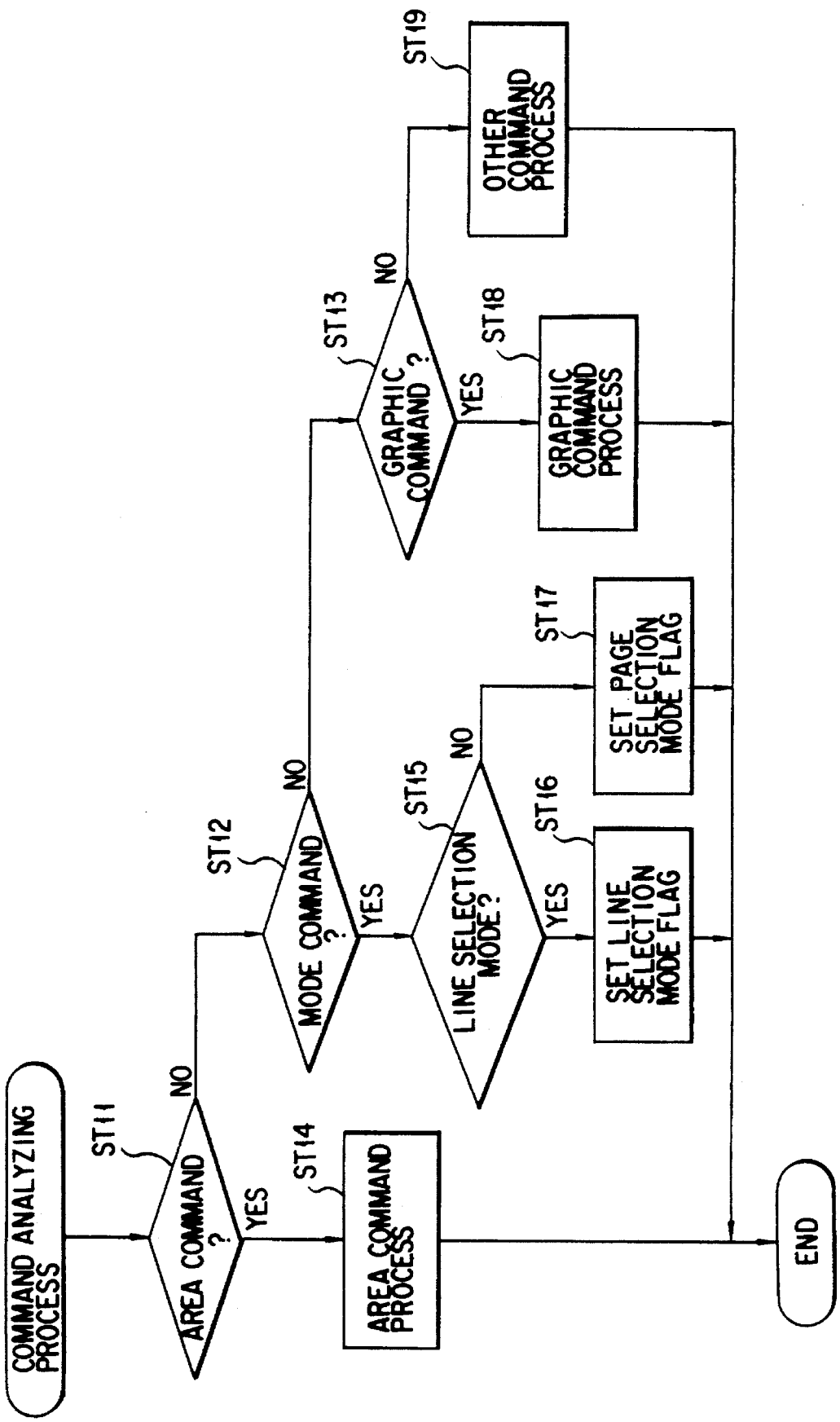
F I G. 5

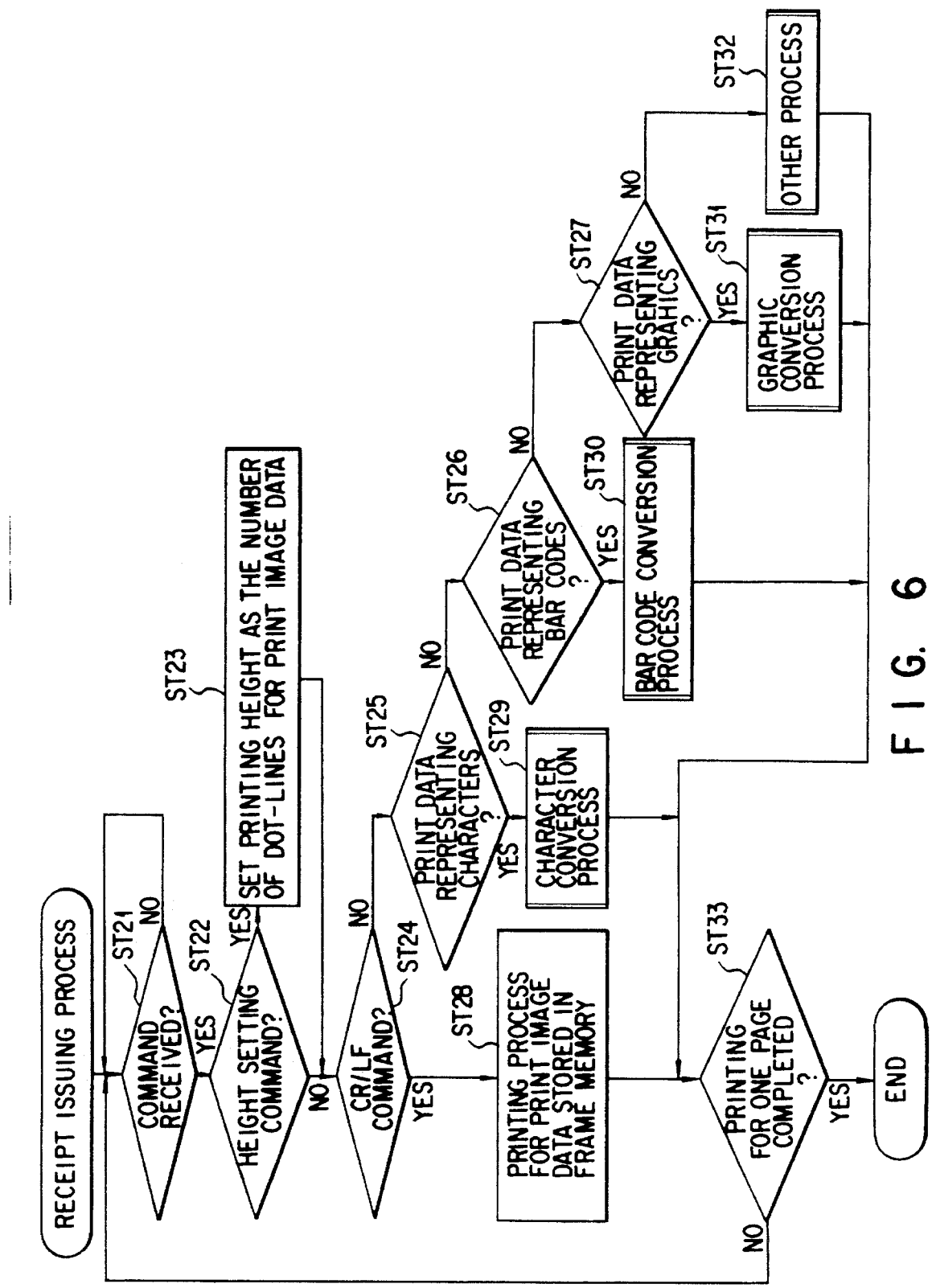
F I G. 6

5,496,116

ARTICLE INFORMATION PRINTER HAVING PAGE AND LINE PRINT MODES

BACKGROUND OF THE INVENTION

1. Field of the Invention

The present invention relates to an article information printer for printing article information in different forms such as characters, bar codes, and graphics.

2. Description of the Related Art

In a supermarket, an article information printer is used to issue a label indicating article information such as an article code, an article name, and an unit price. At the time of issuing labels, the article information printer performs a print preparation process of producing print image data in a dot matrix based on print data for one page which are transmitted from a host computer as article information, and repeatedly performs a printing process according to the print image data produced in the print preparation process so as to issue a required number of labels.

The print preparation process is started after print data for one page have been received from the host computer. In this process, print data are converted into dot images of characters, bar codes, and graphics, and stored in a frame memory as a print image data. In the printing process, the print image data stored in the frame memory is read in units of dot lines, and a printing head is driven in accordance with each read data.

On the other hand, an article information printer may be connected to an electronic cash register serving as the host computer in order to issue a receipt as the record of a sales transaction. In this case, a cash register prepares print data for each article code entered by an operator in sales registration, and transmits all the print data to the article information printer upon completion of the sales registration.

However, when a receipt is to be issued using the above article information printer, a time between completion of the sales registration and completion of the receipt issuance is considerably long. For this reason, the receipt cannot be quickly handed to a customer.

SUMMARY OF THE INVENTION

It is an object of the present invention to provide an article information printer capable of shortening the practical print preparation period required for issuing a single slip on which article information are printed in different forms, without restricting variation in the image height.

The above object can be attained by an article information printer comprising a printing head having a row of dot printing elements, for performing a printing on paper by the dot printing elements, a feed mechanism for feeding the paper in a direction substantially perpendicular to the row of dot printing elements each time the printing head is driven, a memory for storing print image data in a dot matrix form, and a print controller for reading the print image data from the memory in units of dot lines and driving the printing head in accordance with the read data, wherein the print controller has a mode setting section for setting one of a page selection mode and a line selection mode, a first image producing section for performing in the page selection mode a process of converting print data for one page supplied from an external device as article information into dot images and storing the dot images in the memory as the print image data, and a second image producing section for performing in the line selection mode a process of converting print data for one line supplied from the external device as article information into dot images and storing the dot images as the print image data; and the second image producing section includes a printing height changing section for changing the number of dot lines for the print image data according to the maximum height of the dot images obtained for one line.

In this article information printer, the line selection mode is used in a case where it is necessary to issue a single slip on which article information are printed in different forms. When the line selection mode has been set by the mode setting section, the second image producing section converts print data for one line supplied from the external device into dot images, and stores the dot images in the memory as the print image data. The print image data is produced each time print data for one line are supplied from the external device. Accordingly, the practical print preparation period can be shortened in comparison with the case where the print image data is produced after print data for one page have been fully received from the external device.

Generally, when article information are printed in different forms such as characters, bar codes, and graphics, the image height varies for each information. In order to cope with the variation in the image height, the height changing section changes the number of dot lines for the print image data according to the maximum height of the dot images obtained for one line. The printing head is repeatedly driven by the number of times equal to that of the dot lines. Therefore, the article information can be printed in different forms without restricting variation in the image height.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a sectional view showing the arrangement of an article information printer according to an embodiment of the present invention;

FIG. 2 is a sectional view showing the arrangement of the article information printer in a state where its cover is open to exchange a roll of continuous paper;

FIG. 3 is a block diagram showing the circuit of the article information printer shown in FIG. 1;

FIG. 5 is a flowchart for explaining a command analyzing process shown in FIG. 4 in detail;

FIG. 6 is a flowchart for explaining a receipt issuing process shown in FIG. 4 in more detail;

DETAILED DESCRIPTION OF THE PREFERRED EMBODIMENTS

Figure 4:
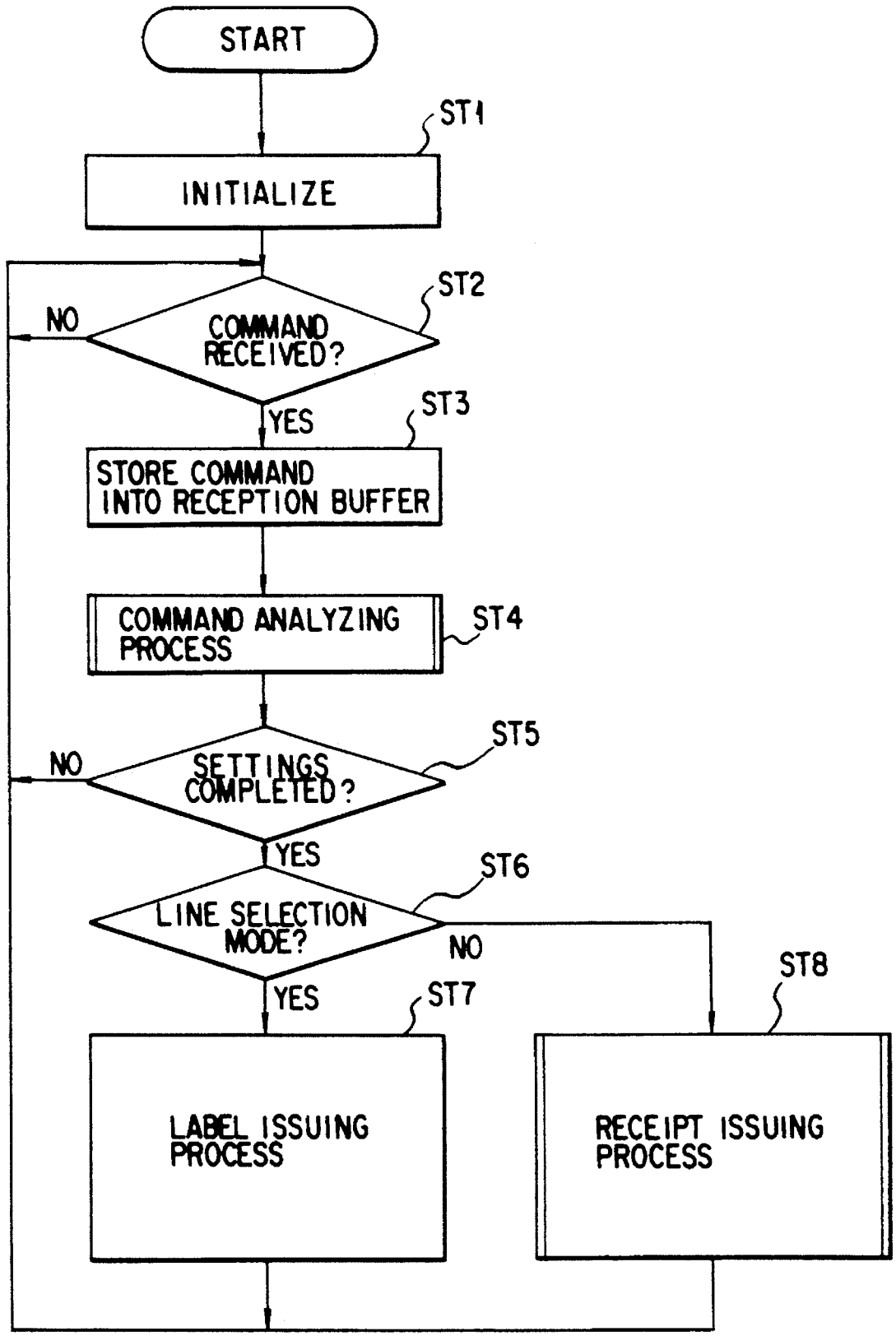
FIG. 4 is a flowchart for explaining the operation of the article information printer shown in FIG. 3.

An article information printer according to an embodiment of the present invention will be described below with reference to the accompanying drawings.

FIG. 1 shows an internal structure of the article information printer. This article information printer has a paper holder HL, a paper guide GD, a printing head unit HD, a platen roller PR1, a peel-off roller PR2, a peel-off plate PL, and a case CS. This case CS has an openable cover CV as shown in FIG. 2. The paper holder HL holds a roll of continuous paper which is rotatably set thereon in a state where the cover CV is open. The cover CV is closed after the leading end of the continuous paper is drawn from the paper holder HL to a label outlet OUT. At this time, the continuous paper is pressed against the platen roller PR1 from the printing head unit HD side. The platen roller PR1 repeatedly feeds the paper by a preset length each time the printing head unit HD performs a printing on a printing area of the paper. Thereafter, the platen roller PR1 continuously feeds the paper to set the leading end of the next printing area to a printing position. When the continuous paper has a series of label seals pasted to a base sheet at a predetermined interval, the base sheet is set to be interposed between the platen roller PR1 and the peel-off roller PR2 after the base sheet passes through the peel-off plate PL. Each label seal is peeled from the base sheet at the position of the peel-off plate PL with the rotation of the platen roller PR1 and the peel-off roller PR2 and supplied to the label outlet OUT.

FIG. 3 shows the circuit arrangement of the article information printer.

This printer has a CPU 1 which performs a control process of controlling the entire operation of the article information printer, a ROM 2 which stores fixed data and a control program for the CPU 1, a static RAM (SRAM) 3 which temporarily stores data input to and output from the CPU 1, an RS-232C driver (communication interface) 4 which receives various control commands transmitted from a host computer and supplying them to the CPU 1, a feed sensor 6 which detects the front and rear ends of a space between two adjacent printing areas of paper, an input/output port 7 which supplies a detection signal from the feed sensor 6 to the CPU 1, and a gate array (input/output interface) 8 which controls peripheral circuits. The CPU 1 is connected to the ROM 2, the SRAM 3, the RS-232C driver 4, the input/output port 7, and the gate array 8 through a system bus 5. The feed sensor 6 is connected to the input/output port 7.

This printer has a printing head 9 which performs a printing on continuous paper in units of dot lines, a pulse motor 10 for rotating the platen roller PR1 to feed the continuous paper in one direction, a motor driver 11 which drives the pulse motor 10, a key/display panel 12 which displays key-in and printer states, a cutter 13 which cuts the continuous paper, and a cutter driver 14 which drives the cutter 13. The printing head 9, the motor driver 11, the key/display panel 12, and the cutter driver 14 are connected to the gate array 8. The pulse motor 10 is connected to the motor driver 11, and the cutter 13 is connected to the cutter driver 14.

The ROM 2 has a storage area which stores various dot images of characters and bar codes as the fixed data, and generating a dot image corresponding to print data supplied from the host computer as a control command. The SRAM 3 has storage areas serving as a reception buffer RB which temporarily stores control commands supplied from a host computer HC, a work memory WK which stores various data set in print preparation, and a frame memory FM which stores print image data in a dot matrix. The work memory WK includes areas which store mode flags, printing height data, a storage start column pointer, and a printing line pointer, for example. The mode flag indicates one of a page selection mode and a line selection mode. The printing height data indicates the number of dot lines for print image data as the height of a printing line. The storage start column pointer indicates a column address of the frame memory FM serving as a point where a dot image is started to be stored. The printing line pointer indicates a row address of the frame memory FM serving as a point where print image data is started to be printed. The printing head 9 is a thermal line head having a row of dot printing elements, and arranged at an end of the printing head unit HD. This printing head 9 is set to be in contact with the platen roller PR1 through the continuous paper in a state where the cover CV is closed, and driven in accordance with print image data read from the frame memory FM in units of dot lines. The pulse motor 10 is meshed with a gear arranged at one end of the platen roller PR1. The platen roller PR1 is driven by rotation of the pulse motor 10, and feeds the continuous paper in a direction perpendicular to the row of the dot printing elements. The feed sensor 6 includes a transmission type optical sensor for detecting a space between two adjacent printing areas on continuous paper for separate issue, and a reflection type optical sensor for detecting a mark printed at an end of each printing area on the upper or lower surface of continuous paper for non-separate issue. When the continuous paper for separate issue has a series of label seals on a base sheet, the space described above corresponds a gap or cutout created between two adjacent label seals on the base sheet. These optical sensors are selected according to the type of continuous paper, and a detection signal from the selected optical sensor is used for confirming the front and rear ends of each printing area while the continuous paper is fed. The key/display panel 12 includes a display, a power switch, a plurality of LEDs, and various control keys such as a paper feed key.

The operation of the article information printer is described below.

After the power switch is turned on, the CPU 1 performs an operation shown in FIG. 4 by executing the control program stored in the ROM 2. When the operation begins, the SRAM 3 and RS-232C diver 4, and other components are initialized in step ST1. Regarding the SRAM 3, the CPU 1 initialize the reception buffer RB, the frame memory FM, and the work memory WK. At this time, the mode flag indicates a page selection mode, the printing height data indicates an ordinary number of dot lines for print image data, the storage start column pointer indicates the initial column address of the frame memory FM, and the printing line pointer indicates the initial row address of the frame memory FM. Step ST2 is repeatedly executed to check if a control command is received from the host computer. When the control command is detected be received, the CPU 1 stores the control command in the reception buffer RB in step ST3, and performs a command analyzing process on the control command read from the reception buffer RB.

FIG. 5 shows the command analyzing process in detail. When the command analyzing process begins, it is checked in steps ST11, ST12, and ST13 whether the read control command is one of an area command, a mode command, and a graphic command. If the read control command is detected to be an area command, the CPU 1 performs in step ST14 an area command process in which data concerning the printing areas in continuous paper are set in the work memory WK.

If the read control command is detected to be a mode command, it is checked in step ST15 whether the mode command of a line selection mode. Note that the mode command is constituted by a series of codes "ESC M 1 CR LF" or "ESC M 0 CR LF". The third code "0" is used to designate a line selection mode, and third code "1" is used to designate a page selection mode. If the mode command is detected to be of a line selection mode, the CPU 1 sets in step ST16 a line selection mode flag in the work memory WK, in place of a page selection mode flag. On the other hand, if the mode command is detected to be of a page selection mode, the CPU 1 sets in step ST17 a page selection mode flag in the work memory WK, in place of a line selection mode flag.

If the read control command is detected to be a graphic command, the CPU 1 performs in step ST18 a graphic command process in which data concerning graphics are set in the work memory WK. If the read control command is not any of the above-mentioned commands, the CPU 1 performs a process of other commands in step ST19. The command analyzing process completes after one of steps ST14, ST16, ST17, ST18, and ST19 is executed.

As shown in FIG. 4, step ST5 is executed after completion of the command analyzing process. In step ST5, it is checked whether settings of data other than printing data are completed. If the settings are not completed, step ST2 is executed again. After completion of the settings, it is checked in step ST6 which one of a line selection mode and a page selection mode is set by mode flags.

If the page selection mode is detected, a label issuing process is performed in step ST7. In this label issuing process, print data for one page are received from the host computer and stored in the reception buffer RB. The CPU 1 performs a print preparation process of converting the print data for one page stored in the reception buffer RB into dot images, and storing the images in the frame memory FM in corresponding formats as a print image data. Thereafter, the CPU 1 performs a printing process of reading the print image data from the frame memory FM in units of dot lines, and repeatedly driving the printing head 9 according to the data read for one dot line. The continuous paper is fed by a preset length each time the printing head 9 is driven. The printed portion of the paper is fed to the outlet OUT after the printing head 9 has been driven by the number of times equal to the total number of dot lines for the print image data, and issued as a label. The label issuing process completes after a required number of labels have been issued by repeating the printing process. The contents of the flame memory FM are cleared upon completion of the label issuing process.

If the line selection mode is detected in step ST6, a receipt issuing process is performed in step ST8. FIG. 6 shows the receipt issuing process in detail.

when the receipt issuing process begins, the CPU 1 repeatedly checks in step ST21 whether a commend is received from the host computer. If a command is detected to be received, it is checked in step ST22 whether the received command is a height setting command. If the received command is not a height setting command, step ST24 is executed. On the other hand, if the received command is a height setting command, a printing height designated by this command is set as the number of dot lines for print image data in step ST23. Step ST24 is executed after step ST23.

In steps ST24–ST27, it is checked whether the received command is one of a CR/LF command, print data representing characters, print data representing bar codes, and print data representing graphics. The CR/LF command is transmitted from the host computer in order to unconditionally change the current printing line to the next. If the CR/LF command is received, it is considered that print image data is already produced from print data for one line and stored in the frame memory FM, and in step ST28 a printing process is performed on the print image data. In this printing process, the CPU 1 performs reads the print image data in units of dot lines from the frame memory FM, and performs a control of repeatedly driving the printing head 9 according to data read for one dot line. The continuous paper is fed by a preset length each time the printing head 9 is driven. The printing head 9 is driven by the number of times equal to the total number of dot lines for the print image data. The printing line pointer is incremented by the total number of dot lines for the print image data during the printing process.

If the received command is print data representing characters, a character conversion process is performed in step ST29. If the received command is print data representing bar codes, a bar code conversion process is performed in step ST30. If the received command is print data representing graphics, a graphic conversion process is performed in step ST31. Further, if the received command is not any of the above-mentioned command and print data, another process is performed in step ST32.

After any of steps ST28–ST31 is executed, step ST33 is executed to confirm completion of printing for one page. If it is not confirmed, step ST21 is executed again. If the completion is confirmed in step ST33, the printed portion of the paper is fed to the outlet OUT, and issued as a receipt. The receipt issuing process completes after a single receipt has been issued in the manner described above. The contents of the flame memory FM are cleared upon completion of the receipt issuing process.

Figure 7:
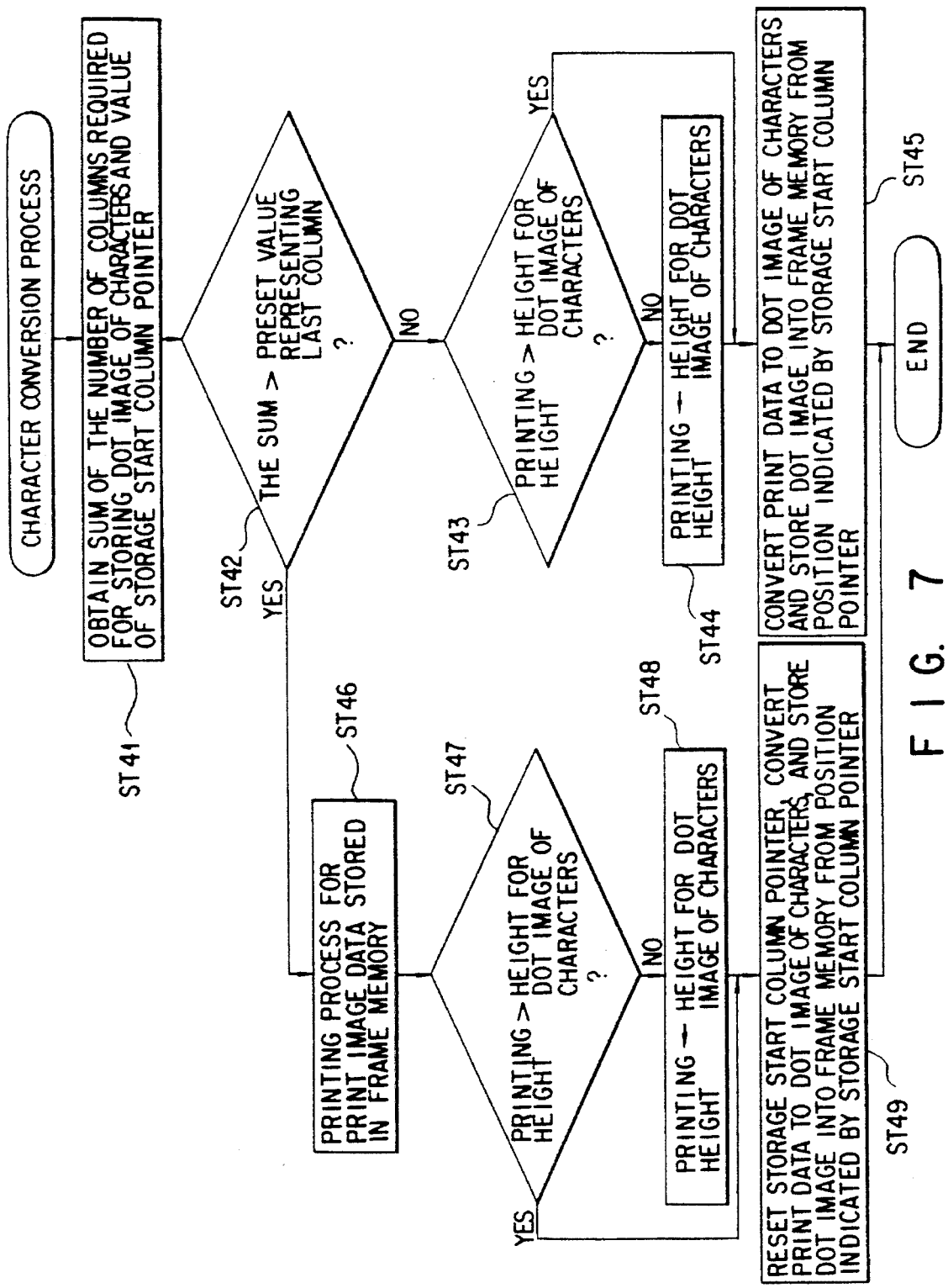
FIG. 7 is a flowchart for explaining a character conversion process shown in FIG. 6 in detail.

FIG. 7 shows the aforementioned character conversion process in detail. When the character conversion process begins, in step ST41 the CPU 1 obtains sum of a value of the storage start column pointer and the number of columns required for storing a dot image of the characters, dimensions of which are designated by a format contained in the print data. Thereafter, the CPU 1 checks in step ST42 whether the sum exceeds a preset value representing the last column address of the frame memory FM. If the sum does not exceed the preset value, it is confirmed in step ST43 that the height for the dot image is lower than the printing height. If the height for the dot image is not lower than the printing height, the printing height is changed to have a value equal to the height for the dot image in step ST44. Thereafter, in step ST 45, the CPU 1 actually converts the print data to a dot image of characters, and stores the dot image into the frame memory FM from the position indicated by the storage start column pointer. At this time, the dot image of the characters has dot lines the number of which corresponds to the height designated by the format.

On the other hand, the sum exceeding the preset value is detected in step ST42, it is considered that the frame memory FM cannot store all the dot image due to shortage of the remaining columns. Therefore, in step ST46, a printing process is performed on print image data already produced in the frame memory FM in the same manner as step ST28 shown in FIG. 6. Thereafter, it is confirmed in step ST47 that the height for the dot image is lower than the printing height. If the height for the dot image is not lower than the printing height, the printing height is changed to have a value equal to the height for the dot image in step ST48. Thereafter, in step ST49, the CPU 1 actually converts the print data to a dot image of characters, and stores the dot image into the frame memory FM from the position indicated by the storage start column pointer. At this time, the dot image of the characters has dot lines the number of which corresponds to the height designated by the format.

Figure 8:
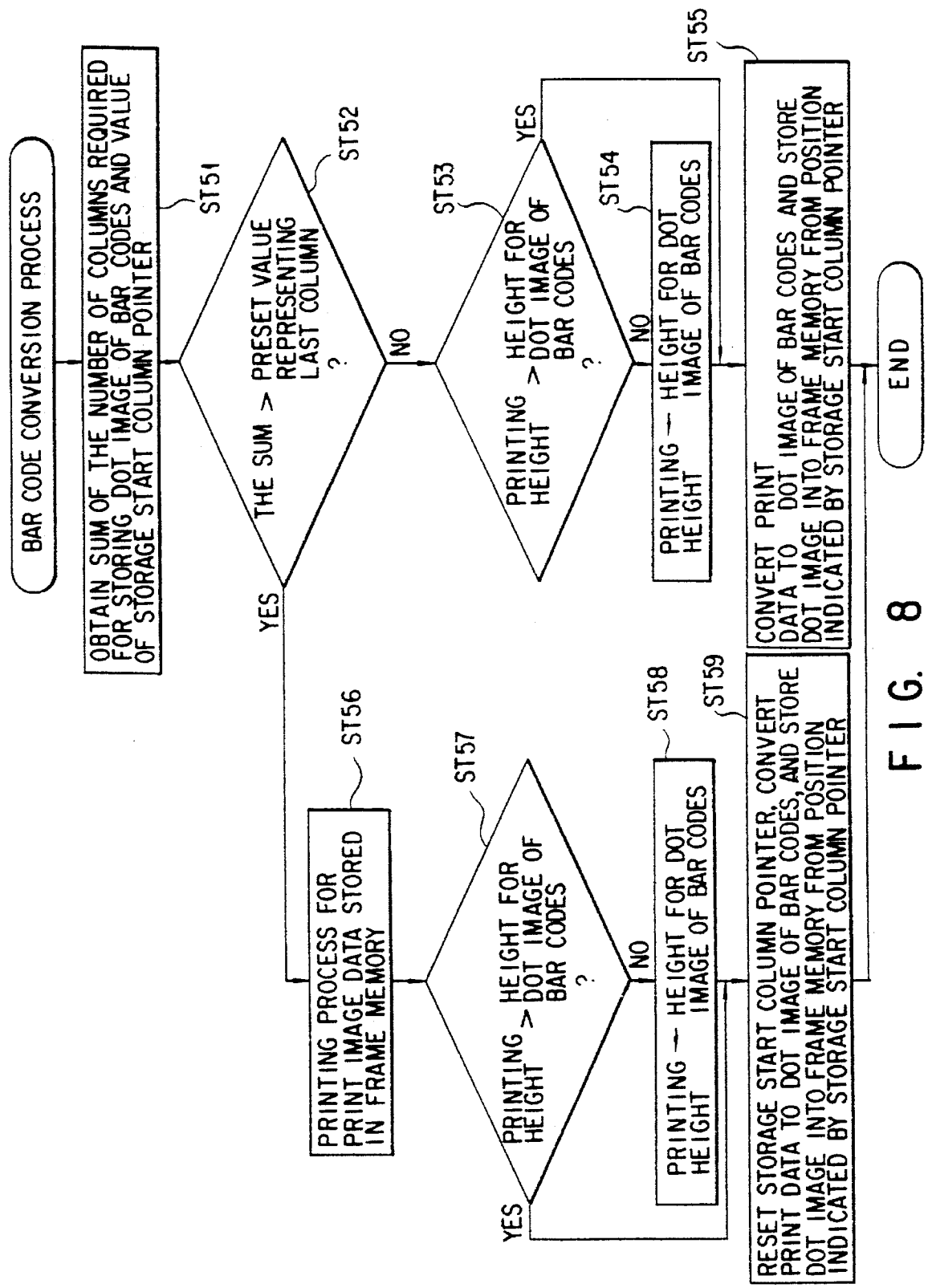
FIG. 8 is a flowchart for explaining a bar code conversion process shown in FIG. 6 in detail.

FIG. 8 shows the aforementioned bar code conversion process in detail. When the bar code conversion process begins, in step ST51 the CPU 1 obtains sum of a value of the storage start column pointer and the number of columns required for storing a dot image of the bar codes, dimensions of which are designated by a format contained in the print data. Thereafter, the CPU 1 checks in step ST52 whether the sum exceeds a preset value representing the last column address of the frame memory FM. If the sum does not exceed the preset value, it is confirmed in step ST53 that the height for the dot image is lower than the printing height. If the height for the dot image is not lower than the printing height, the printing height is changed to have a value equal to the height for the dot image in step ST54. Thereafter, in step ST55, the CPU 1 actually converts the print data to a dot image of bar codes, and stores the dot image into the frame memory FM from the position indicated by the storage start column pointer. At this time, the dot image of the bar codes has dot lines the number of which corresponds to the height designated by the format.

On the other hand, the sum exceeding the preset value is detected in step ST52, it is considered that the frame memory FM cannot store all the dot image due to shortage of the remaining columns. Therefore, in step ST56, a printing process is performed on print image data already produced in the frame memory FM in the same manner as step ST28 shown in FIG. 6. Thereafter, it is confirmed in step ST57 that the height for the dot image is lower than the printing height. If the height for the dot image is not lower than the printing height, the printing height is changed to have a value equal to the height for the dot image in step ST58. Thereafter, in step ST59, the CPU 1 actually converts the print data to a dot image of bar codes, and stores the dot image into the frame memory FM from the position indicated by the storage start column pointer. At this time, the dot image of the bar codes has dot lines the number of which corresponds to the height designated by the format.

Figure 9:
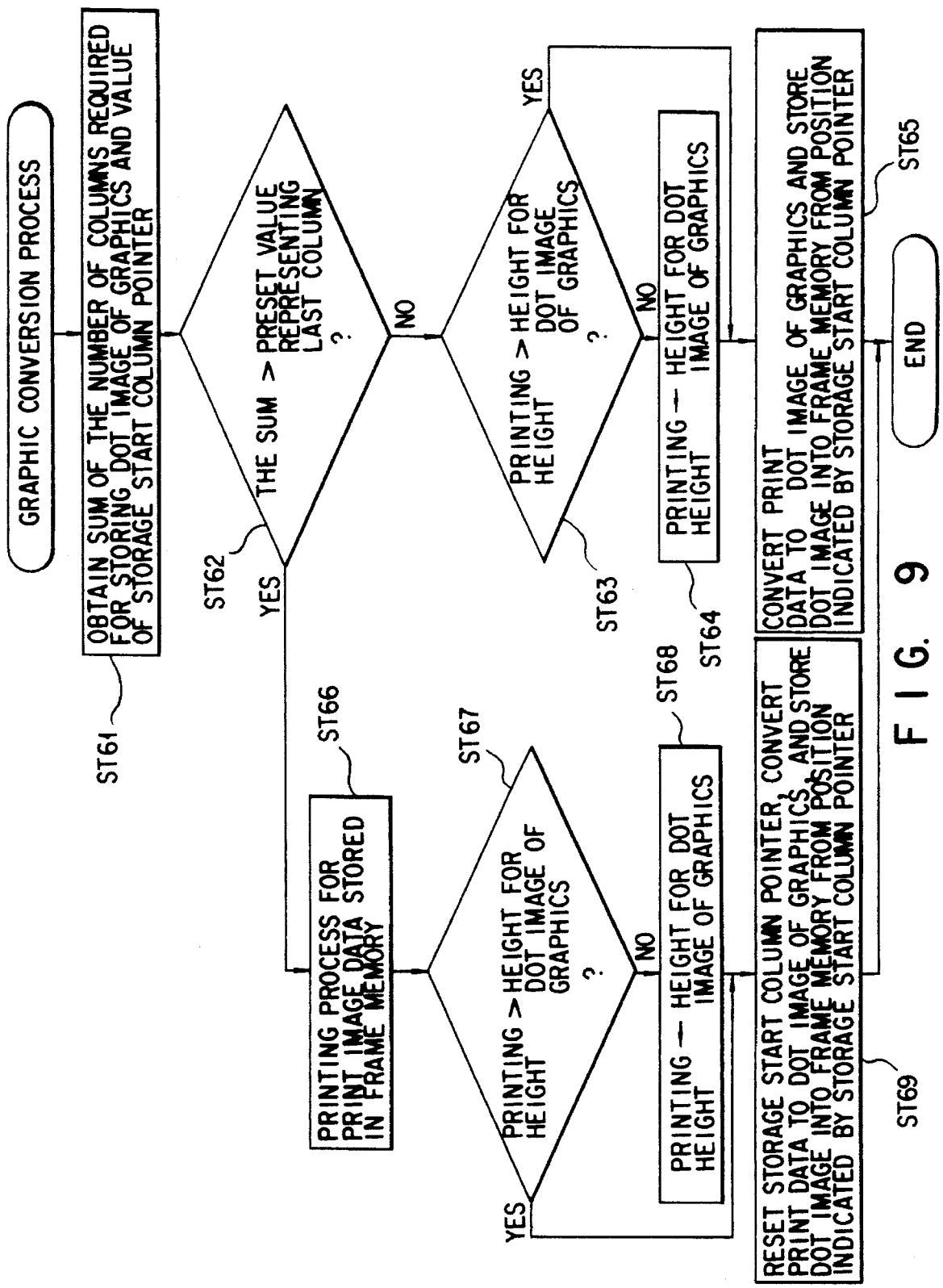
FIG. 9 is a flowchart for explaining a graphic conversion process shown in FIG. 6 in detail.

FIG. 9 shows the aforementioned graphic conversion process in detail. When the bar code conversion process begins, in step ST61 the CPU 1 obtains: sum of a value of the storage start column pointer and the number of columns required for storing a dot image of the graphics, dimensions of which are designated by a format contained in the print data. Thereafter, the CPU 1 checks in step ST62 whether the sum exceeds a preset value representing the last column address of the frame memory FM. If the sum does not exceed the preset value, it is confirmed in step ST63 that the height for the dot image is lower than the printing height. If the height for the dot image is not lower than the printing height, the printing height is changed to have a value equal to the height for the dot image in step ST64. Thereafter, in step ST65, the CPU 1 actually converts the print data to a dot image of graphics, and stores the dot image into the frame memory FM from the position indicated by the storage start column pointer. At this time, the dot image of the graphics has dot lines the number of which corresponds to the height designated by the format.

On the other hand, the sum exceeding the preset value is detected in step ST62, it is considered that the frame memory FM cannot store all the dot image due to shortage of the remaining columns. Therefore, in step ST66, a printing process is performed on print image data already produced in the frame memory FM in the same manner as step ST28 shown in FIG. 6. Thereafter, it is confirmed in step ST67 that the height for the dot image is lower than the printing height. If the height for the dot image is not lower than the printing height, the printing height is changed to have a value equal to the height for the dot image in step ST68. Thereafter, in step ST69, the CPU 1 actually converts the print data to a dot image of graphics, and stores the dot image into the frame memory FM from the position indicated by the storage start column pointer. At this time, the dot image of the graphics has dot lines the number of which corresponds to the height designated by the format.

In the article information printer described above, mode selection is performed on the basis of a mode command "ESC M 0 CR LF" or "ESC M 1 CR LF" transmitted from the host computer. In the page selection mode, the article information printer operates in the manner conventionally known. That is, the printer receives print data for one page transmitted from the host computer, converts the print data for one page to dot images, stores dot images in the frame memory FM as print image data, and performs a printing according to the print image data. In the line selection mode, the printer receives print data for one line transmitted from the host computer, converts the print data for one line to dot images, stores dot images in the frame memory FM as print image data, and performs a printing according to the print image data. For each dot image, if it is confirmed that the frame memory FM cannot store the dot image within a range of the remaining columns, the printing line is automatically changed to the next. Further, the number of dot lines for the print image data or printing height is determined according to the maximum height of dot images obtained by the conversion on the print data for one line. Therefore, article information article information can be printed in different forms such as characters, bar codes, and graphics in the line selection mode.

Figure 10:
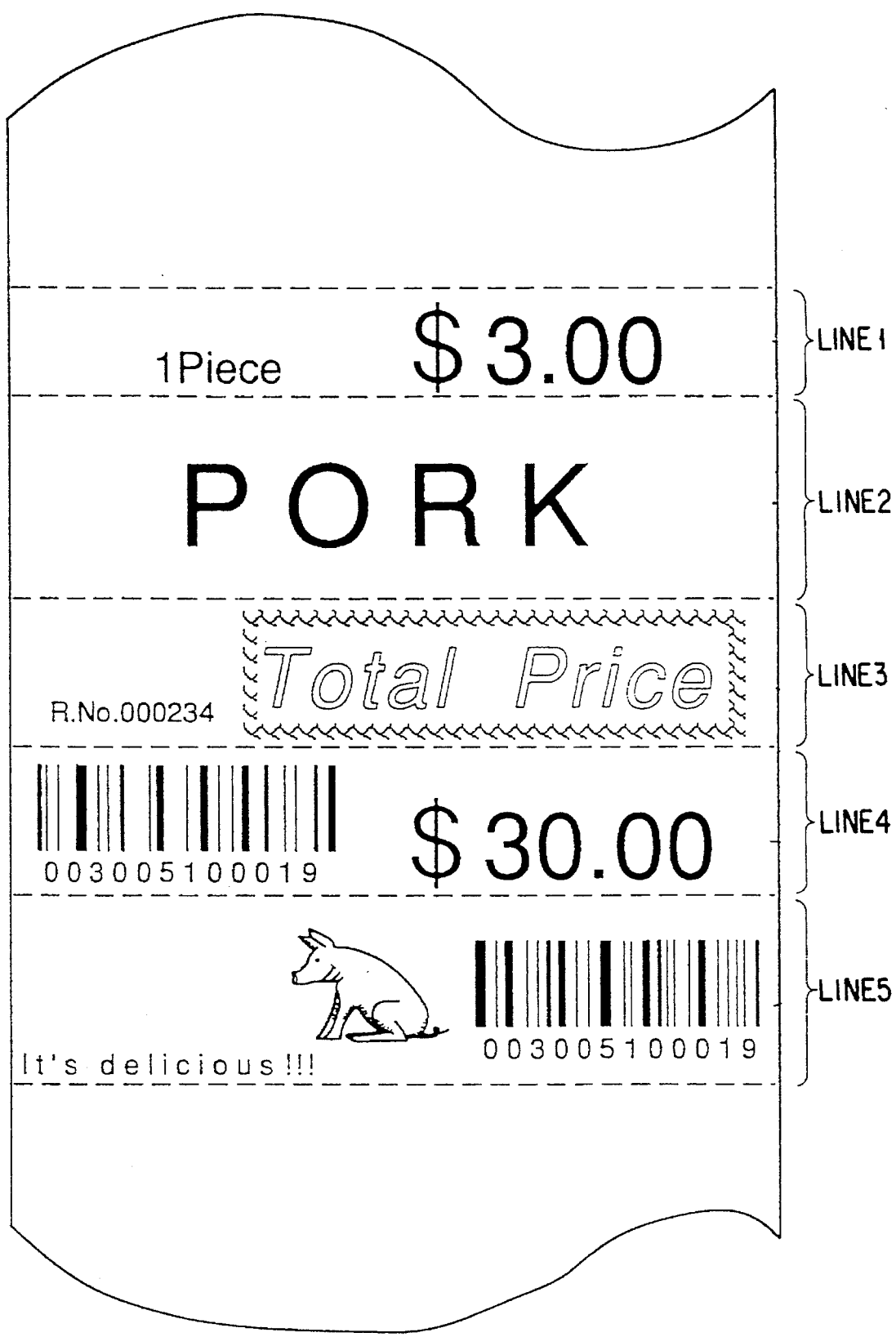
FIG. 10 is a flowchart showing a receipt issued from the article information painter according to this embodiment.

As a result, it is possible to issue a receipt in which the height of each printing line varies with the maximum height of dot images to be printed on the printing line. FIG. 10 shows an example of the receipt, which is constituted by two character images of different sizes printed within a printing line LINE1, a single character image printed within a printing line LINE2, character and graphic images printed within a printing line LINE3, bar code and character images printed within a printing line LINE4, and character, graphic, and bar code images printed within a printing line LINE5.

According to the embodiment, the line selection mode is used for issuing a single receipt in which article information are printed in different forms. In the line selection mode, the article information printer converts the print data for one line supplied from the host computer as article information to dot images, and stores the dot image in the SRAM 3 as print image data. In other words, the print image data is produced each time the print data for one line is supplied from the host computer. Therefore, the practical print preparation period required for issuing the receipt can be shortened in comparison with the case where the print image data is produced after receiving all the print data for one page, which are prepared sequentially.

To cope with variation in the image height of article information printed in different forms such as characters, bar codes, and graphics, the article information printer changes the number of dot lines for print image data or printing height according to the maximum height of dot images obtained for one line, and repeatedly drives the printing head 9 by the number of times equal to that of the dot lines. Therefore, in the line selection mode, the article information printer can print article information regardless of the printing form.

In this embodiment, one of the page selection mode and the line designation mode is selected on the basis of a mode command from the host computer. However, a dip switch or the like for the mode selection can be provided in the article information printer. Further, a nonvolatile memory for storing data indicating a selected mode can be provided in the article information so as to prevent the data from being lost when the power switch of the printer is turned off.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An article information printer comprising:

a printing head having a row of dot printing elements, for performing a printing on paper by said dot printing elements;

a feed mechanism for feeding the paper in a direction substantially perpendicular to the row of dot printing elements each time said printing head is driven;

a memory for storing print image data in a dot matrix form; and a print controller for reading the print image data from Said memory in units of dot lines and for driving said printing head in accordance with the read print image data;

wherein said print controller includes mode setting means for setting one of a page selection mode and a line selection mode, first image producing means for performing in the page selection mode a process of converting print data for one page supplied from an external source as article information into dot images and storing the dot images in said memory as the print image data, and second image producing means for performing in the line selection mode a process of converting print data for one line supplied from the external device as article information into dot images and storing the dot images as the print image data; and said second image producing means includes printing height changing means for changing the number of dot lines for the print image data according to a maximum height of the dot images converted for one line.

2. An article information printer according to claim 1, wherein said second image producing means further includes converting means for performing a conversion each time print data is supplied from the external device and for arranging each dot image obtained by the conversion in a column direction within said memory, and first enabling means for detecting that a predetermined command serving as a delimiter of the print data for one line is supplied from the external device, and for enabling a printing process on print image data formed of dot images which are already stored in said memory before the predetermined command is supplied.

3. An article information printer according to claim 2, wherein said second image producing means further includes second enabling means for detecting shortage of remaining columns from a span of a dot image to be stored in said memory, and for enabling a printing process on print image data formed of dot images stored in said memory prior to said dot image.

4. An article information printer according to claim 3, wherein said second image producing means further includes storage control means for setting a storage start point of a dot image to an initial column of said memory after each of the printing processes enabled by said first and second enabling means.

5. An article information printer according to claim 2, wherein said converting means is arranged to convert various print data to dot images in at least two of a character form, a bar code form, and a graphic form.

* * * * *